(12) United States Patent
Guerrero Apolo

(10) Patent No.: US 10,885,309 B1
(45) Date of Patent: Jan. 5, 2021

(54) SYSTEM AND METHOD FOR EVALUATING PERSONALITY USING ANTHROPOMETRIC MEASUREMENT OF A PERSON'S FACE

(71) Applicant: Intelligex Inc., Miami, FL (US)

(72) Inventor: Jesús David Guerrero Apolo, Barcelona (ES)

(73) Assignee: Intelligex Inc., Miami, FL (US)

( * ) Notice: Subject to any disclaimer, the term of this patent is extended or adjusted under 35 U.S.C. 154(b) by 0 days.

(21) Appl. No.: 17/028,181

(22) Filed: Sep. 22, 2020

(51) Int. Cl.
*G06K 9/00* (2006.01)
*G06T 7/73* (2017.01)
*G06T 7/00* (2017.01)
*G06K 9/46* (2006.01)

(52) U.S. Cl.
CPC ..... *G06K 9/00248* (2013.01); *G06K 9/00281* (2013.01); *G06K 9/4609* (2013.01); *G06T 7/73* (2017.01); *G06T 7/97* (2017.01); *G06T 2207/30201* (2013.01)

(58) Field of Classification Search
CPC ........... G06K 9/00248; G06K 9/00281; G06K 9/4609; G06T 7/97
See application file for complete search history.

(56) References Cited

U.S. PATENT DOCUMENTS

2006/0133654 A1* 6/2006 Nakanishi ............ G06K 9/4642
                                                                    382/118
2019/0005359 A1* 1/2019 Wilf ..................... G06K 9/6256

* cited by examiner

*Primary Examiner* — Ruiping Li
(74) *Attorney, Agent, or Firm* — Mark Terry

(57) ABSTRACT

A system for facilitating evaluating a person's personality through anthropometric measurement of the person's face includes a camera for taking photographs of the person's face from various angles, nonvolatile storage for storing the photographs and a lookup table, volatile memory, a computer processor for analyzing the photographs, taking measurements of the person's face based on a set of features on the person's face, calculating additional measurements, accessing the lookup table that includes multiple sets of measurements of a person's face, and defines a correspondence between each set of measurements and a set of personality characteristics, analyzing the lookup table to identify a set of measurements of the multiple sets of measurements that most closely match the plurality of measurements and the additional measurements, thereby identifying a matching set of measurements, generating a report that defines a set of personality characteristics, and a display for displaying a report.

19 Claims, 6 Drawing Sheets

US 10,885,309 B1

SYSTEM AND METHOD FOR EVALUATING PERSONALITY USING ANTHROPOMETRIC MEASUREMENT OF A PERSON'S FACE

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the field anthropometry and, more specifically, to the evaluation of personality traits and features through the use of anthropometric measurements of the craniofacial structure.

BACKGROUND

The use of anthropometry directly dates back to 1883 when Alphonse Bertillon used the measurements of physical features such as bony structures in the body to classify and later identify criminal offenders. Over the years, other uses for anthropometry arose and the various practices were refined and improved for application to processes outside of the recognition of recidivists. Despite significant improvements having been made, engagement in anthropometric practices was relatively exclusive. Specifically, it was largely available only to those who could afford the costly tools and systems used to collect and analyze the data. The potential user pool was further narrowed only to men of higher education who were specifically trained in the space, greatly limiting its use and development throughout the late 1800s and through the 1900s.

In more recent years, thanks to advancements in technology, the potential uses of anthropometry have grown as extensively as access thereto in the same period. Over the last several decades, anthropometric characteristics have been used and studied for intelligence testing, to test the relationship between anthropometric characteristics and psychological factors, as well as more commercial uses such as determining manufacturing needs for clothing producers. While these advancements have clearly expanded access to the field of study and consequentially its use, it has not yet reached a level at which the average consumer can accurately measure anthropometric characteristics and be evaluated therefrom without expending excessive amounts of money and/or time. Costly tools are still commonly utilized, and the use of technological advancements are often limited to equally, if not more, expensive technology such as three-dimensional scanners. In the cases where more accessible tools are utilized, the analyses are usually directed to a specific field of employment, experience or expression, or physiological response to specific stimulus, similarly excluding the majority of interested consumers.

In light of the above-mentioned shortfalls, a need exists for a convenient, user-friendly and cost-efficient objective method and system for personality assessment based on association with anthropometric characteristics to provide an anthropometric psychological report to consumers, since recent studies on craniofacial psychology associated the face shape with personality.

BRIEF SUMMARY

In one embodiment, a system for evaluating a person's personality through anthropometric measurement of the person's face is disclosed. The system includes a camera for taking a plurality of photographs of the person's face from various angles, nonvolatile storage for staring said plurality of photographs and a lookup table, volatile memory, a computer processor, and a display for displaying a report. The computer processor is configured to execute instructions on a computer readable medium for: 1) analyzing the plurality of photographs so as to identify a predefined set of features on the person's face; 2) taking a plurality of measurements of the person's face based on the set of features that were identified, including measuring an inclination of the person's forehead, a bizygomatic breadth and a width of each zygomatic arch; 3) calculating additional measurements based on the plurality of measurements, including a ratio of the bizygomatic breadth and the width of a zygomatic arch; 4) accessing the lookup table that includes multiple sets of measurements of a person's face, and defines a correspondence between each set of measurements and a set of personality characteristic; 5) analyzing the lookup table to identify a set of measurements of the multiple sets of measurements that most closely match the plurality of measurements and the additional measurements, thereby identifying a matching set of measurements; and 6) generating a report that defines a set of personality characteristics in the lookup table that correspond to the matching set of measurements.

In another embodiment, a method for evaluating a person's personality through anthropometric measurement of the person's face is disclosed. The method includes taking a plurality of photographs of the person's face from various angles, storing said plurality of photographs and a lookup table, volatile memory, analyzing a plurality of photographs so as to identify a predefined set of features on the person's face, taking a plurality of measurements of the person's face based on the set of features that were identified, including measuring an inclination of the person's forehead, a bizygomatic breadth and a width of each zygomatic arch, calculating additional measurements based on the plurality of measurements, including a ratio of the bizygomatic breadth and the width of a zygomatic arch, accessing the lookup table that includes multiple sets of measurements of a person's face, and defines a correspondence between each set of measurements and a set of personality characteristics, analyzing the lookup table to identify a set of measurements of the multiple sets of measurements that most closely match the plurality of measurements and the additional measurements, thereby identifying a matching set of measurements, generating a report that defines a set of personality characteristics in the lookup table that correspond to the matching set of measurements and, displaying the report Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

The disclosed embodiments improve upon the problems with the prior art by providing a system that allows a person to receive a personality evaluation based on anthropometric measurement of the person's face measured through photographs taken using a camera of the person's mobile device. Specifically, the disclosed embodiments improve upon the prior art by reducing the cost typically associated with evaluations based on anthropometric measurements by eliminating the need for costly tools and similarly eliminating the need for a person to arrange for a professional to take measurements and conduct an analysis therefrom. The disclosed embodiments further improve upon the prior art by significantly reducing any potential burdens of time through the real-time analysis of photos uploaded by a user. The disclosed embodiments improve upon the prior art by evaluating a person's personality based on the interaction and association of the shape of the face with the personality in both healthy and clinical subjects.

Figure 1:
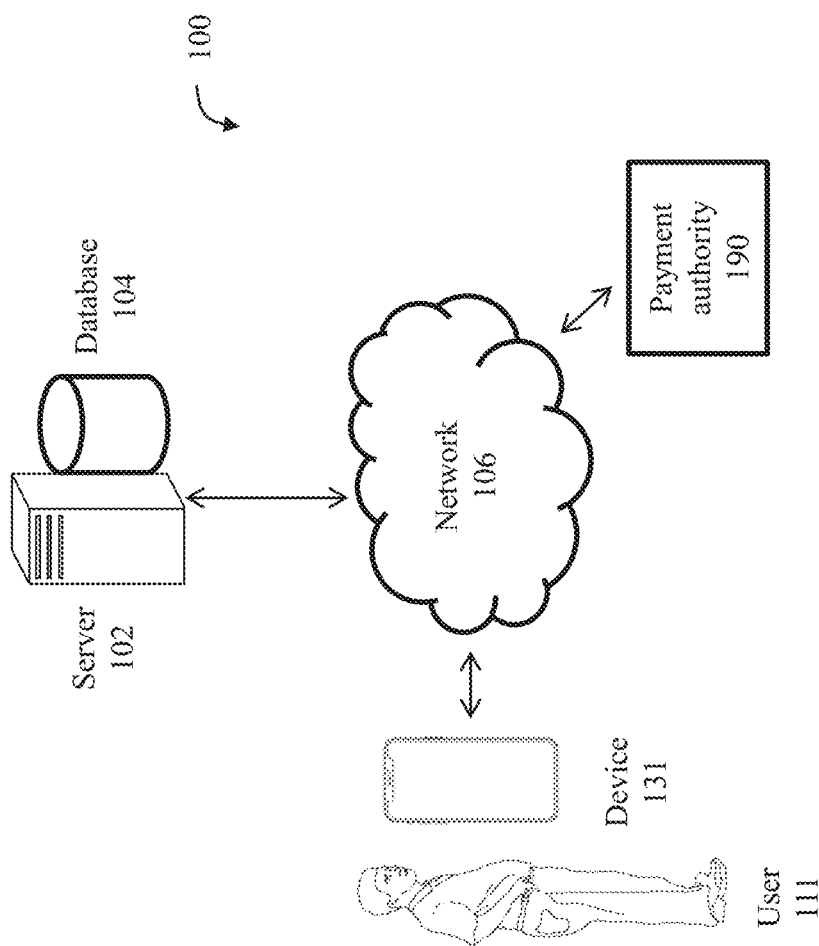
FIG. 1 is a block diagram illustrating the network architecture of a system for evaluating a person's personality through anthropometric measurement of the person's face, in accordance with one embodiment.

Referring now to the drawing figures in which like reference designators refer to like elements, there is shown in FIG. 1 an illustration of a block diagram showing the network architecture of a system 100 for evaluating a person's personality through anthropometric measurement of the person's face in accordance with one embodiment. A prominent element of FIG. 1 is the server 102 associated with repository or database 104 and further communicatively coupled with network 106. Network 106 can be a circuit switched network, such as the Public Service Telephone Network (PSTN), or a packet switched network, such as the Internet or the World Wide Web, the global telephone network, a cellular network, a mobile communications network, or any combination of the above. Server 102 is a central controller or operator for functionality of the disclosed embodiments, namely, providing personality evaluation through anthropometric measurements of a person's face.

FIG. 1 also includes mobile computing device 131, which may be a smart phone, mobile phone, tablet computer, handheld computer, laptop, or the like. In another embodiment, mobile computing devices 131, may be workstations, desktop computers, servers, laptops, all-in-one computers, or any like computing device that is capable of taking photographs or connection to a peripheral camera device capable of taking photographs. Mobile computing device 131 corresponds to a person or user 111 desiring to receive a personality evaluation based on the anthropometric measurements of their face. Device 131 may be communicatively coupled with network 106 in a wired or wireless fashion.

FIG. 1 further shows that server 102 includes a database or repository 104, which may be a relational database comprising a Structured Query Language (SQL) database stored in a SQL server. Device 131 may also include its own database. The repository 104 serves data from a database, which is a repository for data used by server 102 and device 131 during the course of operation of the disclosed embodiments. Database 104 may be distributed over one or more nodes or locations that are connected via network 106.

The database 104 may include a user record for each user 111. A user record may include: contact/identifying information for the user (name, address, telephone number(s), email address, etc.), electronic payment information for the user, information pertaining to previous evaluations of the user such as measurements, sales transaction data associated with the user, etc. A user record may further include demographic data for each user, such as age, sex, income data, race, color, marital status, etc. The database 104 may also include a virtual record for each evaluation of the user that was completed. A virtual record may comprise user information, sales transaction data associated with said user, a user's measurements, and any other data that was collected, calculated, generated or transmitted during evaluation of a user, including photographs, measurements, transmissions and reports.

Sales transaction data may include one or more product/service identifiers (such as SKUs) for services offered or purchased, one or more product/service amounts, buyer contact/identifying information, and electronic payment information. In one embodiment, electronic payment information may comprise buyer contact/identifying information and any data garnered from a purchase card (i.e., purchase card data), as well as any authentication information that accompanies the purchase card. Purchase card data may comprise any data garnered from a purchase card and any authentication information that accompanies the purchase card. In one embodiment, electronic payment information may comprise user login data, such as a login name and password, or authentication information, which is used to access an account that is used to make a payment.

FIG. 1 shows an embodiment wherein networked computing device 131 interacts with server 102 and repository 104 over the network 106. It should be noted that although FIG. 1 shows only the networked computer 131, the system of the disclosed embodiments supports any number of networked computing devices connected via network 106. Further, server 102 and unit 131 include program logic such as computer programs, mobile applications, executable files or computer instructions (including computer source code, scripting language code or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such device 131. Further, server 102 and its functionality, according to a preferred embodiment, can be realized in a centralized fashion in one computer system or in a distributed fashion wherein different elements are spread across several interconnected computer systems.

FIG. 1 also shows a payment authority 190, which acts to effectuate payments by user 111 for their personality evaluation. In the course of a sales transaction, server 102 may interface with payment authority 190 to effectuate payment. In one embodiment, the payment authority 190 is a payment gateway, which is an e-commerce Application Service Provider (ASP) service that authorizes and processes payments from one party to another. The payment authority 190 may accept payment via the use of purchase cards, i.e., credit cards, charge cards, bank cards, gift cards, account cards, etc.

Figure 2A:
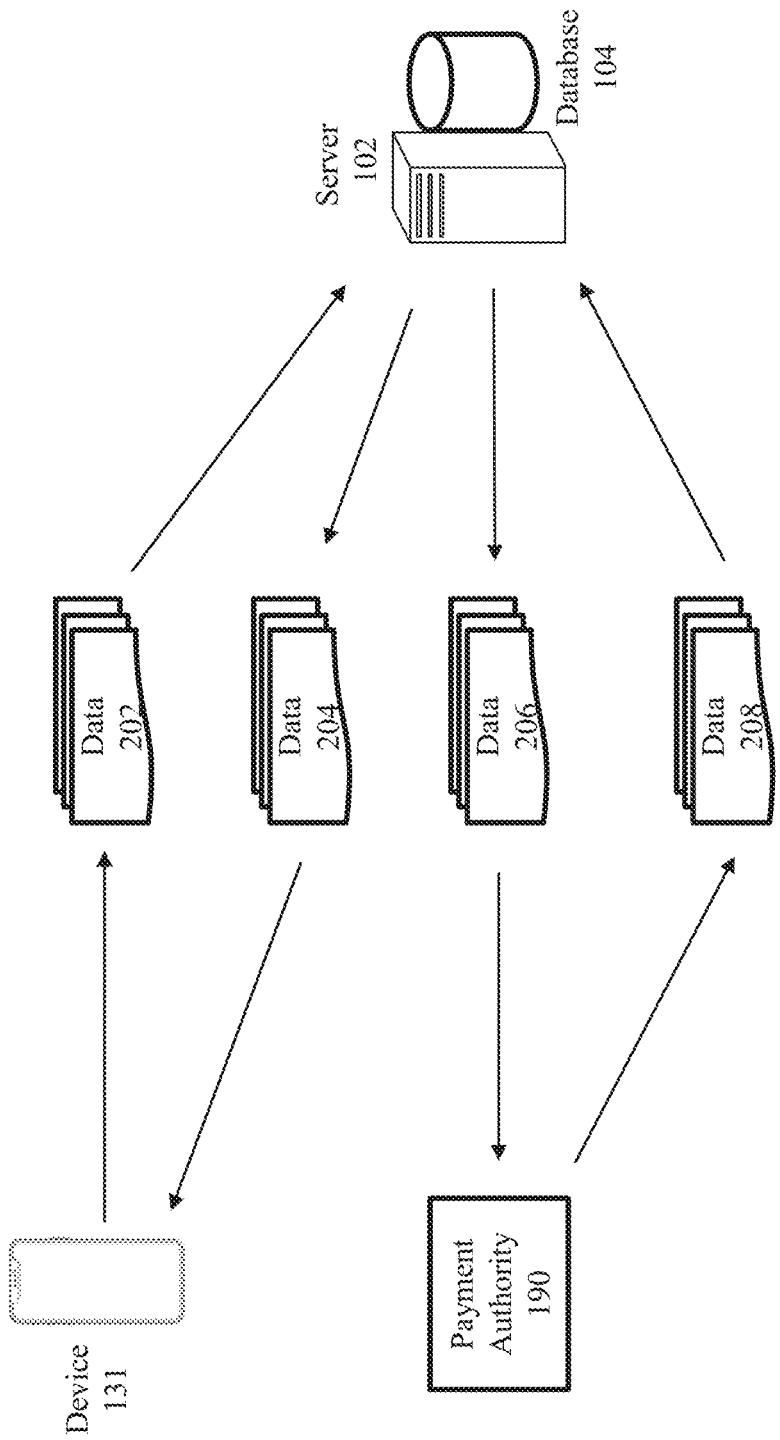
FIG. 2A is a block diagram showing the data flow of the process for evaluating a person's personality through anthropometric measurement of the person's face, according to one embodiment.

The process of evaluating a person's personality through anthropometric measurement of the person's face will now be described with reference to FIGS. 2A-3 below. FIG. 2A depicts the data flow of the process for evaluating a person's personality through anthropometric measurement of the person's face. In FIG. 2A the user's mobile device 131 sends a plurality of photographs of the user's face to the server 102 via data packet 202. Once the server has received the user's photographs, the photographs are processed and analyzed, and a report is generated based on the analysis. The report is returned for display on the user's device 131 via data packet 204. In another embodiment, the processing and analyzing of the photographs, and the generation of the report occurs on the device 131.

Data packet 202 may also be used to send the user's payment information to the server 102. Once server 102 has processed data packet 202, a user's payment information is sent to payment authority 190 for payment processing via data packet 206. A confirmation of the payment is then sent from payment authority 190 to server 102 via data packet 208. Upon receiving confirmation of payment from payment authority 190, server 102 returns the above-mentioned report, including the results of the evaluation conducted using user 111's photographs, to the user's device 131 via data packet 204. Data packet 204 may also include information relating to the confirmation of payment received by the server in data packet 208.

Figure 2B:
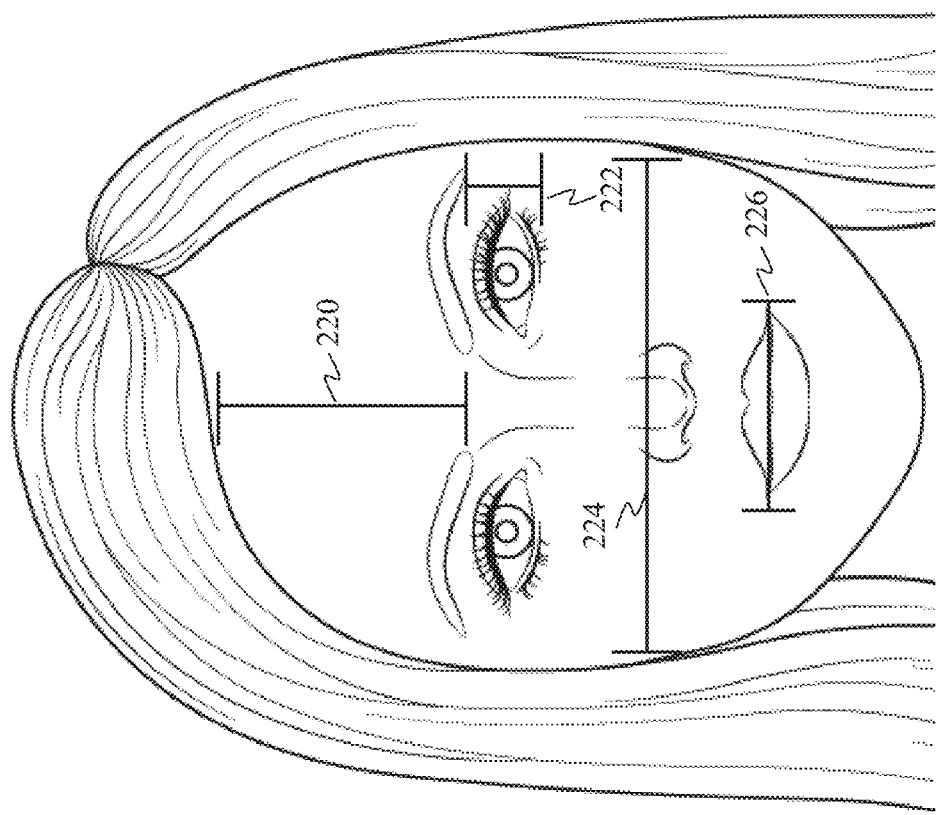
FIG. 2B is a drawing depicting examples of measurements taken on a user's face during the process for evaluating a person's personality through anthropometric measurement of the person's face, in accordance with one embodiment.

FIG. 2B is a drawing depicting examples of measurements taken of a user's face during the process for evaluating a person's personality through anthropometric measurement of the person's face, in accordance with one embodiment. FIG. 2B shows a person's face as it may be shown in a photograph taken by the user. Various measurements of the user's face may be used in the evaluation, such as the vertical length of the forehead 220, the height of an eye 222, bizygomatic width 224, and width of the mouth 226. While FIG. 2B discloses a limited number of measurements, these are intended as example measurements and by no means are intended to function as an exhaustive list of anthropometric measures to be considered in the present system.

Figure 2C:
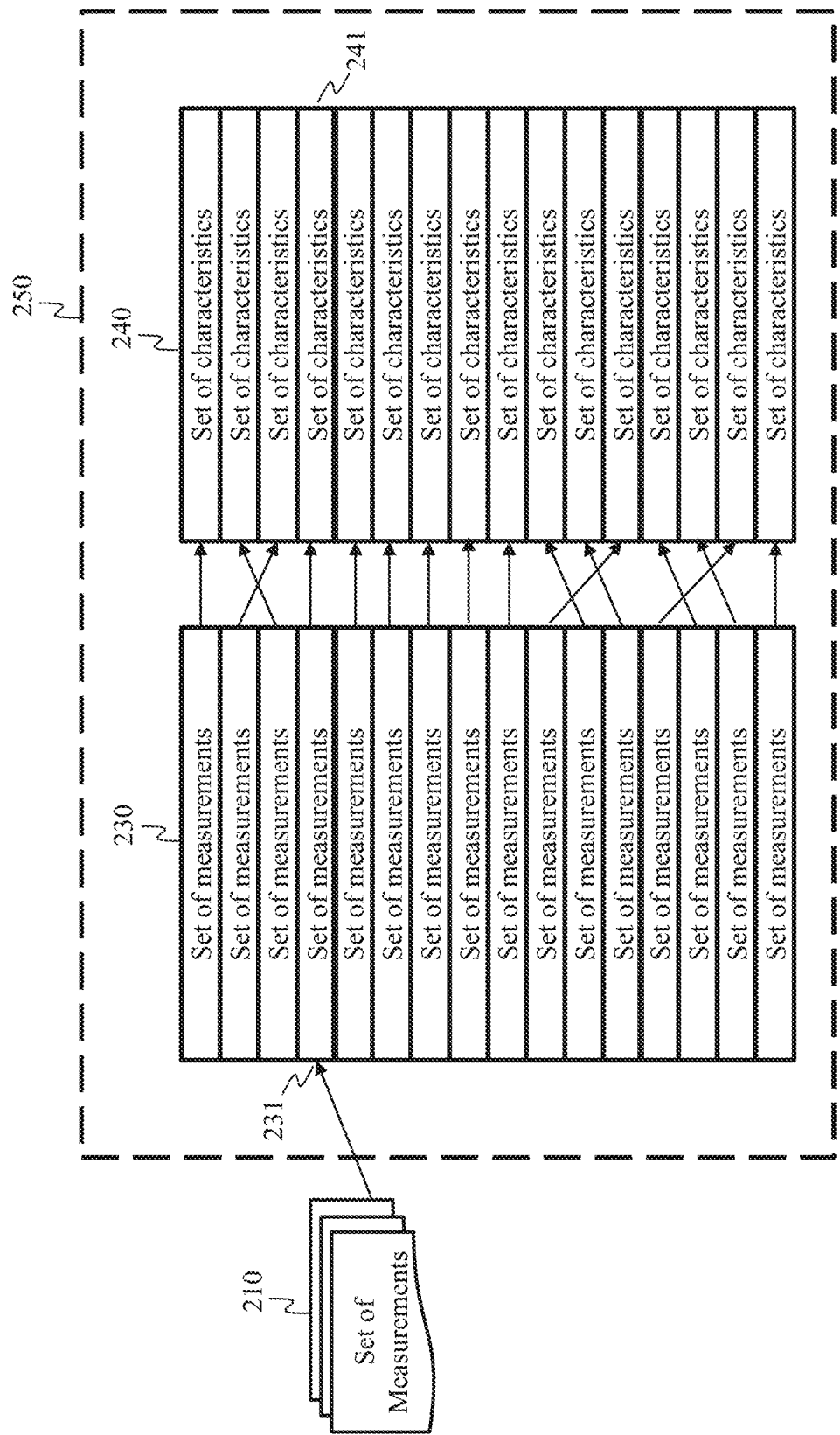
FIG. 2C is a block diagram depicting correspondences between data during the process for evaluating a person's personality through anthropometric measurement of the person's face, in accordance with one embodiment.

FIG. 2C is a block diagram depicting correspondences between data during the process for evaluating a person's personality through anthropometric measurement of the person's face, in accordance with one embodiment. FIG. 2C that a set of measurements 210 have been taken or calculated based on the user 111's photographs. FIG. 2C also shows a lookup table 250 that includes a first list 230 including multiple sets of measurements of a person's face, and a second list 240 including multiple sets of personality characteristics, wherein the lookup table defines a correspondence between each set of measurements in list 230 and each set of personality characteristics in list 240. The correspondence between each set of measurements in list 230 and each set of personality characteristics in list 240 may be one-to-one, one-to-many or many-to-one.

In one embodiment, the closest match between the set of measurements 210 and one of the entries in the first list 230 is the set of measurements 231 in list 230. The set of measurements 231 corresponds to the set of personality characteristics 241 in list 240, according to lookup table 250.

In another embodiment, the lookup table 250 not only defines a correspondence between a set of measurements and a set of personality characteristics. The lookup table may also show a correspondence between a set of measurements and suitability for certain work environments or jobs, compatibility with superiors, aptitudes, work attitude, level of adaptation to a company, level of loyalty, level of reliability, work competency, amenability, impulsivity, reflexivity, emotional score, psychopathologies described in the DSM-5 or CIE 10 psychiatry manuals, compatibility with others, most suitable jobs and occupations, vocational or occupational suitability, academic orientation, etc.

Figure 3:
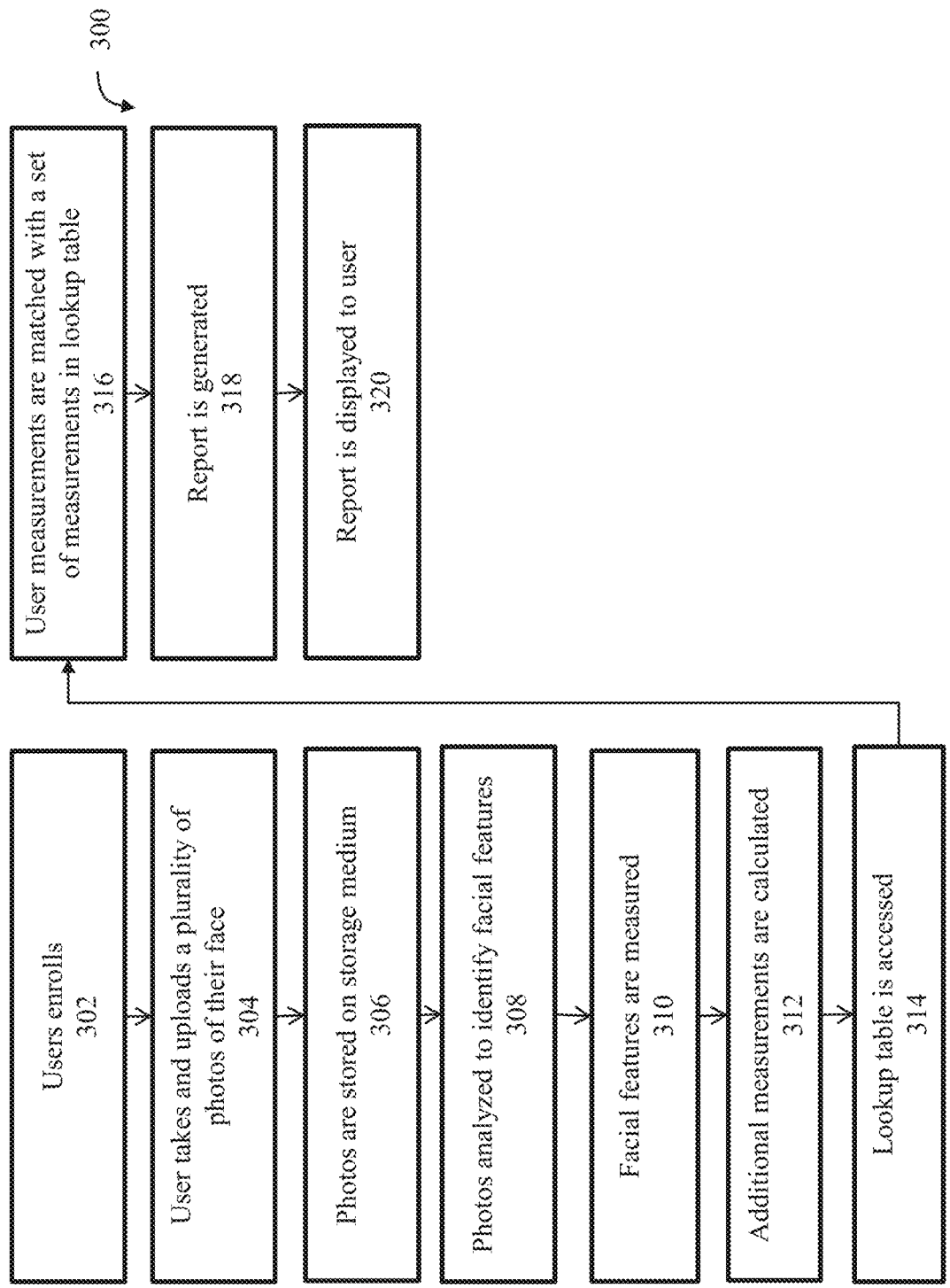
FIG. 3 is a flow chart depicting the general control flow of a process for evaluating a person's personality through anthropometric measurement of the person's face, according to one embodiment.

FIG. 3 depicts the control flow the process for evaluating a person's personality through anthropometric measurement of the person's face, according to one embodiment. The process of the disclosed embodiments begins with optional step 302 (see flowchart 300), wherein the user 111 may enroll or register with server 102. In the course of enrolling or registering, the user may enter data into his device 131 by manually entering data into a mobile application or website. In the course of enrolling or registering, the user may enter any data that may be stored in a user record, as defined above. Also in the course of enrolling or registering, the server 102 may generate a user record for each registering user and store the user record in an attached database, such as database 104.

Subsequently, in step 304, the user 111 takes a plurality of photos of their face from various angles for evaluation, using his device 131. Said angles may include a front view of the face, right side view, left side view, top view, bottom view, front perspective view, side perspective view, top perspective view, bottom perspective view, three quarter view of the face, etc. The user 111 may take said photos using the built-in cameras on their mobile computing device 131 or, alternatively, may use any peripheral camera device such as a web-cam on a desktop computer. Upon upload of the plurality of photos, the photos are stored on a storage medium for subsequent analysis in step 306.

In an optional step, electronic payment information may be presented by the user 111 and transmitted by server 102 to payment authority 190 for processing. The payment authority 190 processes the electronic payment information and verifies whether payment has been effectuated. If so, the payment authority 190 may send a verification message to the server 102 thereby verifying that the payment has been effectuated.

Once a user's plurality of photos have been stored, the photos are then analyzed, by server 102 and/or device 131, in step 308 to identify a pre-defined set of features on the person's face and/or neck. The identified facial features are then used to conduct measurements on the person's face 310. The predefined set of features may include each eye, each ear, each nostril, the nose, each lip, the mouth, each cheekbone, the chin, the forehead, the hairline, each eyebrow, any facial hair, each eyelid, each cheek, the eyelashes, each temple, the teeth, the neck, the borders defining each of the features above, the colors defining each of the features above, the location of each of the features above, and the like.

In step 310, a plurality of measurements of the person's face and/or neck are taken, by server 102 and/or device 131, based on the set of features that were identified. Said measurements include measuring an inclination of the person's forehead, a bizygomatic breadth and a width of each zygomatic arch. Measurements may be a plurality of measurements including the distance between identified features such as eyes, ears, zygomatic arches, length or width of forehead, etc. Said measurements may further include the shape of the face, the width of the face, the height and width of the face, fleshiness of the face, the dryness of the face, the tonicity level of the face, the symmetry of the face, the degree of inclination of the forehead, the height and width of the forehead, the shape of the forehead, the presence of veins in the forehead, the height and width of the eyebrows, the location of the eyebrows, the length of the nose and septum, the height and width of the nose and each nostril, the fleshiness of the tip of the nose, the tilt of the nose, the size of the nostrils, the shape of the nostrils, the thickness of the nose, the height and width of the eyes, the shape of the eyes, the depth of the eyes, the slant of the eyes, the state (open, closed, ajar) of the mouth, the height and width of the mouth, the thickness of the lips, the presence of folds on or near the mouth, the height and width of the chin, the shape of the chin, tilt of the chin, the height and width of the neck, the thickness of the neck, the presence of folds on or near the beck, the shape of the neck, tilt of the neck, etc.

Using the measurements taken in step 310, additional measurements may be calculated 312, by server 102 and/or device 131. Additional measurements may include a ratio of previously measured data. For example, additional measurements based on the plurality of measurements include a ratio of the bizygomatic breadth and the width of a zygomatic arch. Additional measurements may include comparisons of measurements of the left and right side of the face to determine asymmetries (or symmetries) between the two sides of the face. After all measurements have been taken and calculated (collectively referred to as the set of measurements 210), a lookup table is accessed 314, by server 102 and/or device 131. The lookup table 250 may include a first list 230 including multiple sets of measurements of a person's face, and a second list 240 including multiple sets of personality characteristics, wherein the lookup table defines a correspondence between each set of measurements in list 230 and each set of personality characteristics in list 240. The correspondence between each set of measurements in list 230 and each set of personality characteristics in list 240 may be one-to-one, one-to-many or many-to-one.

In step 316, server 102 and/or device 131, attempts to find the best match between the set of measurements 210 and one of the entries in the first list 230 which include multiple sets of measurements of a person's face. The best match is referred to as the matching set of measurements 231 in list 230. The set of measurements 231 corresponds to the set of personality characteristics 241 in list 240, according to lookup table 250.

In another embodiment, the lookup table 250 not only defines a correspondence between a set of measurements and a set of personality characteristics. The lookup table may also show a correspondence between a set of measurements and suitability for certain work environments or jobs, compatibility with superiors, aptitudes, work attitude, level of adaptation to a company, level of loyalty, level of reliability, work competency, amenability, impulsivity, reflexivity, emotional score, psychopathologies described in the DSM-5 or CIE 10 psychiatry manuals, compatibility with others, most suitable jobs and occupations, vocational or occupational suitability, academic orientation, etc.

In step 318 a report is generated, by server 102 and/or device 131, based on the set of personality characteristics (or other items) identified as corresponding with the user's measurements, and said report displayed to the user in step 320. The report may include all relative information based on the identified personality characteristics such as aptitude for a job, amenability to those in a field of employment, personality traits, strengths and weaknesses, etc. The report may be transmitted, by server 102 and/or device 131, via network 106 to other parties.

In one embodiment, report will be valid for the current time, since variations in the face may occur over time, which may affect the evaluation of the subject's personality, especially in the field of psychopathology. In other instances, variations in the face may occur can be observed if a traumatic event has occurred that destabilizes the subject's personality, which may affect the evaluation of the subject's personality.

Figure 4:
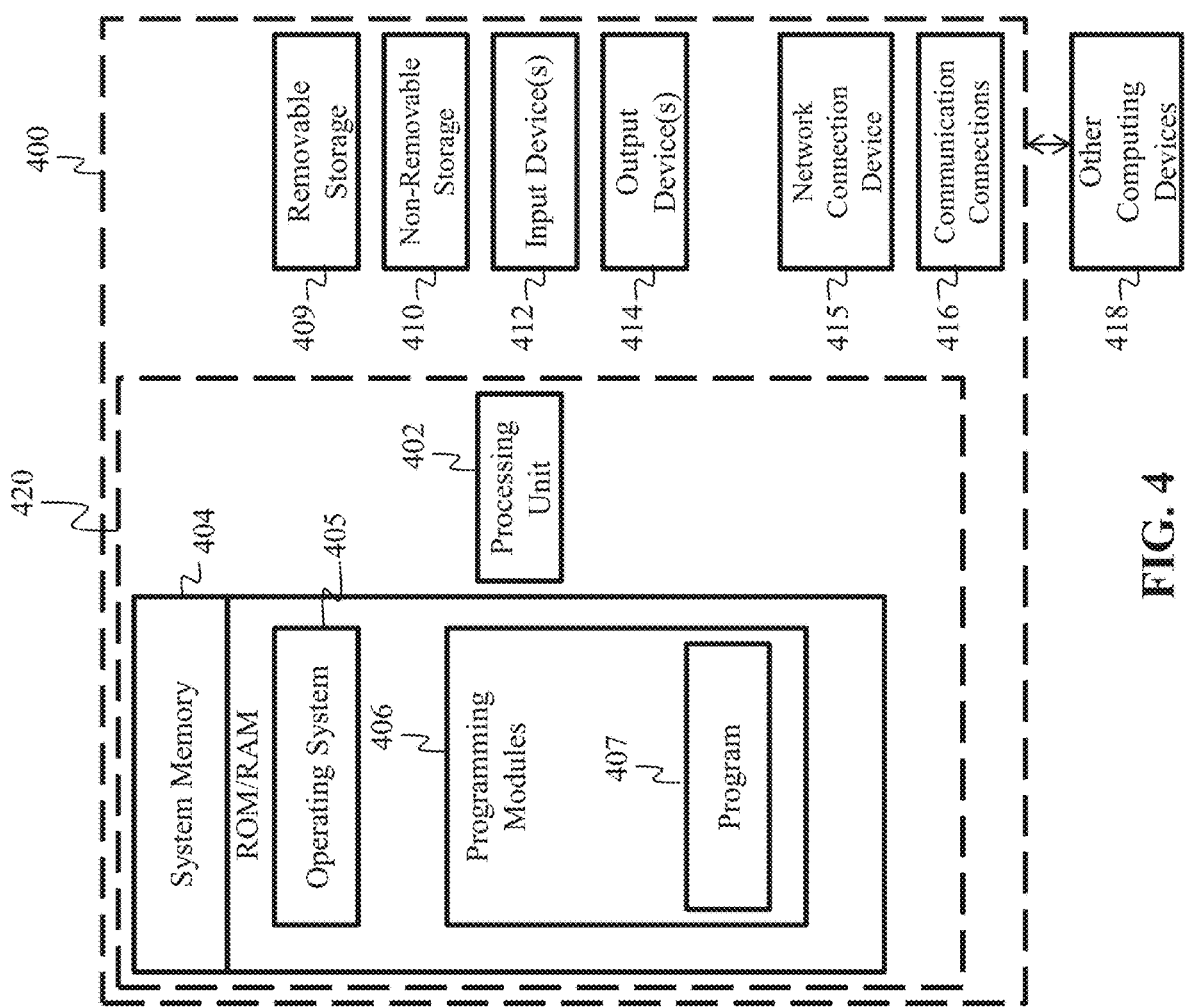
FIG. 4 is a block diagram depicting a system including an example computing device and other computing devices.

FIG. 4 is a block diagram of a system including an example computing device 400 and other computing devices. Consistent with the embodiments described herein, the aforementioned actions performed by 131 and 102 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for system 100 and process 300, as described above. Process 300 may operate in other environments and are not limited to computing device 400.

With reference to FIG. 4, a system consistent with an embodiment may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random-access memory (RAM)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of 131 and 102. Furthermore, embodiments may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. Computing device 400 may also include a vibration device capable of initiating a vibration in the device on command, such as a mechanical vibrator or a vibrating alert motor. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of the process 300 as described above. The aforementioned processes are examples, and processing unit 402 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for evaluating a person's personality through anthropometric measurement of the person's face, comprising:
 a) a camera for taking a plurality of photographs of the person's face from various angles;
 b) nonvolatile storage for storing said plurality of photographs and a lookup table;

c) volatile memory;
d) a computer processor configured to execute instructions on a computer readable medium for:
1) analyzing the plurality of photographs so as to identify a predefined set of features on the person's face;
2) taking a plurality of measurements of the person's face based on the set of features that were identified, including measuring an inclination of the person's forehead, a bizygomatic breadth and a width of each zygomatic arch;
3) calculating additional measurements based on the plurality of measurements, including a ratio of the bizygomatic breadth and the width of a zygomatic arch;
4) accessing the lookup table that includes multiple sets of measurements of a person's face, and defines a correspondence between each set of measurements and a set of personality characteristics;
5) analyzing the lookup table to identify a set of measurements of the multiple sets of measurements that most closely match the plurality of measurements and the additional measurements, thereby identifying a matching set of measurements; and
6) generating a report that defines a set of personality characteristics in the lookup table that correspond to the matching set of measurements; and
e) a display for displaying the report.

2. The system of claim 1, wherein the computer processor is further configured for analyzing the plurality of photographs so as to identify a predefined set of features on the person's neck, when visible in the plurality of photographs, and for taking a plurality of measurements of the person's neck based on the set of features that were identified.

3. The system of claim 2, wherein the computer processor is further configured for accessing the lookup table that includes multiple sets of measurements of a person's face and neck and defines a correspondence between each set of measurements and a set of personality characteristics.

4. The system of claim 3, wherein the lookup table is further configured to include a correspondence between each set of measurements and a set of jobs and occupations.

5. The system of claim 4, wherein the lookup table is further configured to include a correspondence between each set of measurements and a set of vocational or occupational suitability.

6. The system of claim 5, wherein the lookup table is further configured to include a correspondence between each set of measurements and amenability.

7. The system of claim 5, wherein the computer processor is further configured for transmitting the report to another party via a connected communications network.

8. A method on a computing system for evaluating a person's personality through anthropometric measurement of the person's face, the method comprising:
a) taking a plurality of photographs of the person's face from various angles;
b) storing said plurality of photographs and a lookup table;
c) volatile memory;
d) analyzing a plurality of photographs so as to identify a predefined set of features on the person's face;
e) taking a plurality of measurements of the person's face based on the set of features that were identified, including measuring an inclination of the person's forehead, a bizygomatic breadth and a width of each zygomatic arch;
f) calculating additional measurements based on the plurality of measurements, including a ratio of the bizygomatic breadth and the width of a zygomatic arch;
g) accessing the lookup table that includes multiple sets of measurements of a person's face, and defines a correspondence between each set of measurements and a set of personality characteristics;
h) analyzing the lookup table to identify a set of measurements of the multiple sets of measurements that most closely match the plurality of measurements and the additional measurements, thereby identifying a matching set of measurements;
i) generating a report that defines a set of personality characteristics in the lookup table that correspond to the matching set of measurements; and
j) displaying the report.

9. The method of claim 8, further comprising:
analyzing the plurality of photographs so as to identify a predefined set of features on the person's neck, when visible in the plurality of photographs, and for taking a plurality of measurements of the person's neck based on the set of features that were identified.

10. The method of claim 9, further comprising:
accessing the lookup table that includes multiple sets of measurements of a person's face and neck and defines a correspondence between each set of measurements and a set of personality characteristics.

11. The method of claim 10, wherein the lookup table is further configured to include a correspondence between each set of measurements and a set of jobs and occupations.

12. The method of claim 11, wherein the lookup table is further configured to include a correspondence between each set of measurements and a set of vocational or occupational suitability.

13. The method of claim 12, wherein the lookup table is further configured to include a correspondence between each set of measurements and amenability.

14. The method of claim 13, further comprising:
transmitting the report to another party via a connected communications network.

15. A system for evaluating a person's personality through anthropometric measurement of the person's face, comprising:
a) a camera for taking a plurality of photographs of the person's face and neck from various angles;
b) nonvolatile storage for storing said plurality of photographs and a lookup table;
c) volatile memory;
d) a computer processor configured to execute instructions on a computer readable medium for:
1) analyzing the plurality of photographs so as to identify a predefined set of features on the person's face and neck;
2) taking a plurality of measurements of the person's face and neck based on the set of features that were identified, including measuring an inclination of the person's forehead, a bizygomatic breadth and a width of each zygomatic arch;
3) calculating additional measurements based on the plurality of measurements, including a ratio of the bizygomatic breadth and the width of a zygomatic arch;
4) accessing the lookup table that includes multiple sets of measurements of a person's face and neck, and defines a correspondence between each set of measurements and a set of personality characteristics;

5) analyzing the lookup table to identify a set of measurements of the multiple sets of measurements that most closely match the plurality of measurements and the additional measurements, thereby identifying a matching set of measurements; and 6) generating a report that defines a set of personality characteristics in the lookup table that correspond to the matching set of measurements; and e) a display for displaying the report.

16. The system of claim 15, wherein the lookup table is further configured to include a correspondence between each set of measurements and a set of jobs and occupations.

17. The system of claim 16, wherein the lookup table is further configured to include a correspondence between each set of measurements and a set of vocational or occupational suitability.

18. The system of claim 17, wherein the lookup table is further configured to include a correspondence between each set of measurements and amenability.

19. The system of claim 18, wherein the computer processor is further configured for transmitting the report to another party via a connected communications network.

* * * * *